Patented Feb. 6, 1945

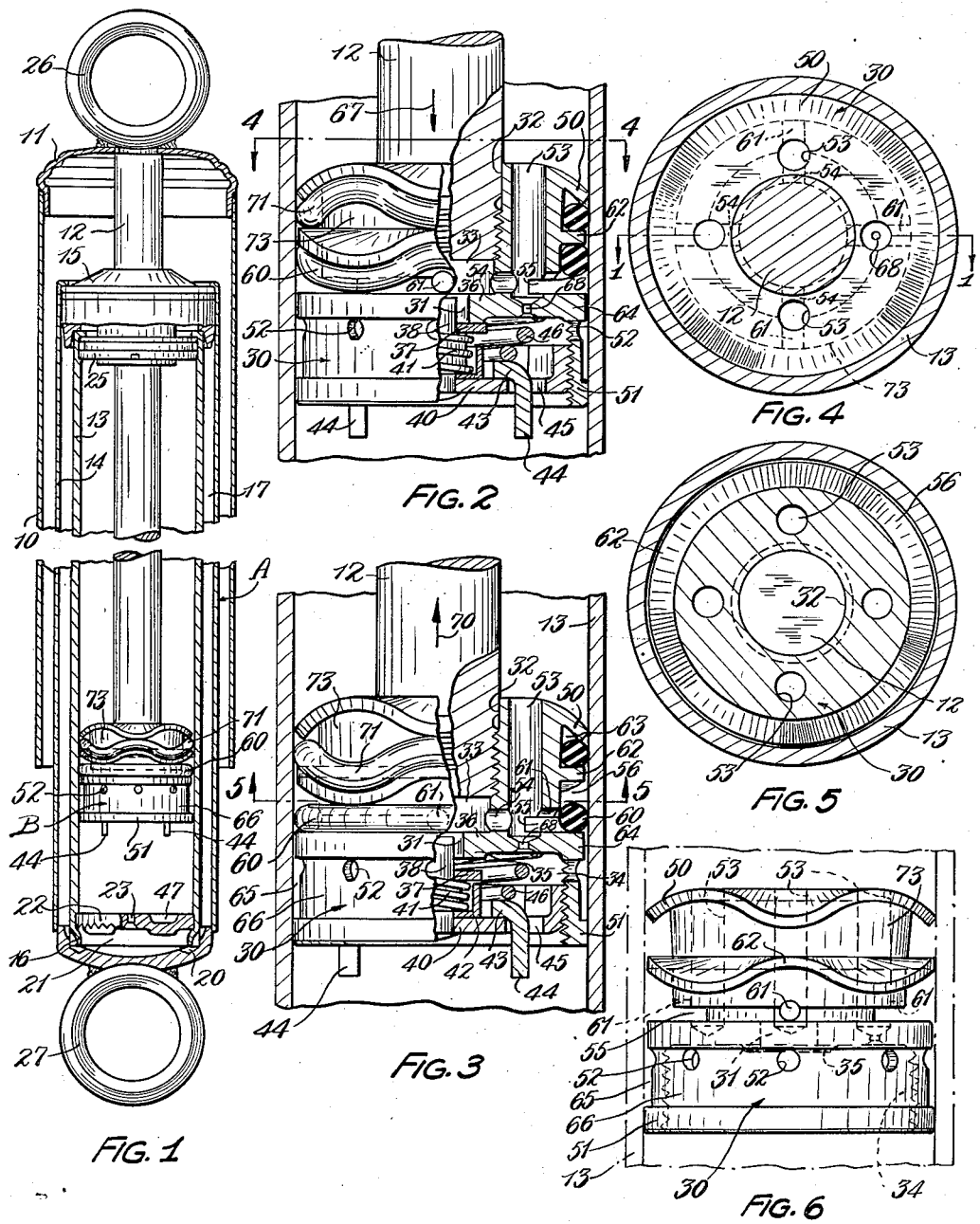

2,369,008

UNITED STATES PATENT OFFICE 2,369,008

SHOCK ABSORBER

Eugene L. Beecher, Cleveland Heights, Ohio, assignor to The Gabriel Company, Cleveland, Ohio, a corporation of Ohio Application February 4, 1944, Serial No. 521,014

9 Claims. (Cl. 188—88)

The present invention relates to fluid pressure devices and, more particularly, to fluid shock absorbers suitable for use on vehicles.

An object of the present invention is the provision of a fluid device comprising novel and improved packing and/or valve means, which device is simple in construction, durable in use, and has improved operating characteristics.

Another object of the invention is the provision of a novel and improved fluid shock absorber suitable for use on vehicles, which shock absorber will have improved shock absorbing operating characteristics and is so designed as to require a minimum number of readily manufacturable parts.

Another object of the invention is the provision of a fluid shock absorber of the character referred to which, in addition to the above mentioned features, includes self-energizing frictional resistance means of novel and improved design for supplementing the fluid resistance of the shock absorber during the impact stroke thereof.

Another object of the invention is the provision of novel and improved packing and/or valve means for fluid devices comprising a rubber-like resilient elastic ring or annular member normally circular in cross-section, confined in an annular groove formed in one of the relatively movable parts and of less depth than the thickness of the ring or annular member, the width of which groove is alternatively equal to and greater than the axial dimension of the ring or annular member when in operative position.

Another object of the invention is the provision of novel and improved self-energizing frictional resistance means for a shock absorber or the like, which means comprises a rubber-like resilient elastic ring or annular member, normally circular in cross-section, confined in an annular groove formed in one of the relatively movable parts, which groove is of varying depth in the axial direction but of less depth than the thickness of the ring or annular member and has alternate portions, the width of which is equal to and greater than the axial dimension of the ring or annular member when in operative position.

The present invention resides in certain constructions and combinations and arrangements of parts and further objects and advantages thereof will be apparent to those skilled in the art to which it relates from the following disclosure and description of the preferred embodiment described with reference to the accompanying drawing, forming a part of this specification, in which similar reference characters designate corresponding parts, and in which;

Fig. 1 is a longitudinal sectional view, with portions in elevation, approximately on the line 1—1 of Fig. 4 showing a direct acting hydraulic shock absorber embodying the present invention.

Figs. 2 and 3 are enlarged fragmentary views of the shock absorber shown in Fig. 1; Fig. 2 showing the relative positions of the various parts of the piston assembly during the impact or compression stroke of the shock absorber, and Fig. 3 showing the position of the same parts during the recoil stroke.

Fig. 4 is a sectional view approximately on the line 4—4 of Fig. 2.

Fig. 5 is a sectional view approximately on the line 5—5 of Fig. 3, and

Fig. 6 is an enlarged elevational view of the piston proper.

In certain aspects, the present invention may be considered an improvement on the device shown in my copending application Serial Number 490,290, filed June 10, 1943, entitled Shock absorber, and is herein illustrated and described as embodied in such a device, however, it is to be understood that the invention is not limited to the particular construction shown in said application or to shock absorbers, as will be apparent from the following disclosure.

Referring to the drawing the shock absorber shown therein which, as previously stated, is merely illustrative of the invention, is a direct double-acting hydraulic shock absorber of a type suitable for use on motor-driven vehicles and the like. Except for the piston assembly, the shock absorber shown is similar in construction to that shown in my above-identified application and is not herein shown and described in detail. Generally speaking, the shock absorber shown comprises an outer substantially cylindrical casing 10 closed at its upper end by a cup-shaped member 11 fixed thereto in a suitable manner and to the upper end of the piston rod 12. The cylindrical casing 10 forms a housing for the upper part of the double-walled cylinder assembly, designated generally by the reference character A, comprising inner and outer cylindric tubular members or cylinders 13 and 14, respectively, within the inner member 13 of which the piston assembly, designated generally by the reference character B, is slidably supported. The upper and lower ends of the tubular members 13 and 14 are closed by cup-shaped members 15 and 16, respectively, which members together with the tubular members 13 and 14, form an air-tight chamber or reservoir between the respective walls of the cylinder assembly.

The reservoir 17 is in continuous communication by means of a plurality of circumferentially spaced internal grooves 20 in the member 16, with a chamber 21 in the lower end of the tubular member 13 formed by the member 16 and by a disk-like member 22 fixed within the tubular member 13 adjacent to but spaced a short distance from its lower end. The reservoir 17 is for the reception of oil or like fluid used in the shock absorber, and particularly that displaced by the piston rod 12. The chamber 21 underneath the member 22 is in constant communication with the lower end of the working cylinder by a relatively small aperture or opening 23 extending through the member 22. In addition to the member 15, the upper end of the tubular member 13 is closed by an annular member 25 fixed within the upper end thereof, which annular member in addition to forming the upper end of the working cylinder, serves as a guide member for the piston rod 12. Suitable packing means is interposed between the members 15 and 25 to prevent the escape of fluid about the piston rod 12. Ring members 26 and 27 fixed to the upper end of the piston rod 12 and to the member 16 in any suitable manner as by welding, provide means for connecting the shock absorber to the vehicle in a conventional manner. The construction of the shock absorber thus far described is similar to that shown in my above identified application to which reference is made for a more complete description thereof.

As shown, the piston member proper of the piston assembly B is machined from a single piece of stock and comprises a one piece cylindrically shaped member 30 having an axially extending central opening 31 counterbored at opposite ends. The upper counter bore 32 is threaded at its upper end and receives the lower threaded end of the piston rod 12. The piston rod 12 and piston member 30 are fixedly secured together by the cooperating threads thereon and, in operation, act or move as a unit. The piston rod 12 does not extend to the bottom of the counterbore 32, thus forming a chamber 33 underneath the end of the piston rod, which chamber is in continuous communication with the reduced central bore or opening 31 which, in turn, communicates with the lower concentric counterbore 34 formed in the lower end of the member 30. The lower end of the bore 31 opens into a raised annular portion 35 formed on the underside of the partition 36 separating the counterbores 32 and 34, which raised annular portion projects into the counterbore 34 and forms a valve seat for a disk valve 37 slidably supported on a short rod 38 fixed as by riveting to a cup-shaped member 40 threaded into the counterbore 34. The valve 37 is normally held in its upper position, see Fig. 2, that is in a position to close the lower end of the bore 31, by a compression spring 41 interposed between the lower side thereof and the bottom of a cup-shaped member 42 surrounding the lower end of the rod 38 and fixed thereto and to the member 38 by being riveted to the member 40 along with the rod 38.

The member 40 is screwed into or out of the counterbore 34 for the purpose of adjusting the spring 41 and, in turn, the pressure at which the valve 37 will open and permit fluid to flow from the chamber 33 to the counterbore 34 by way of the opening 31. This is accomplished by an adjusting member 43 located in the counterbore 34 above the member 40 and having arm portions 44 which project downward through openings 45 in the member 40. The member 43 is held in continuous contact with the upper side of the member 40 by a coiled spring 46 interposed between the upper side thereof and the bottom of the counterbore 34, that is, the lower side of the partition 36. The projections 44 are adapted to engage within suitable apertures or recesses 47 in the upper side of the member 22 when the shock absorber is collapsed, that is, when the piston assembly is moved to its extreme lower position, thus permitting the member 30 to be rotated upon rotation of the piston rod 12 while the member 40 is held stationary by the engagement of the arms 44 in the recesses 47. The spring 46 facilitates the engagement of the projections 44 within the apertures 47 and, in addition, forms a locking means which prevents accidental rotation of the member 40 within the counterbore 34. The counterbore 34 is in continuous communication with the exterior of the piston member 30, which is of reduced diameter, between the upper and lower flanges 50 and 51 thereof, by a plurality of radial passages 52, in the present instance six, equally spaced circumferentially about the piston member 30.

In addition to the counterbore 31, the upper end of the piston member 30 is provided with a plurality of axially extending cylindrical apertures 53, in the present instance four, equally spaced about the counterbore 32. The apertures 53 are in continuous communication with the chamber 33 underneath the piston rod 12 by radial passages 54 communicating with the lower end thereof and the lower end of the counterbore 32. In addition, the lower ends of the apertures 53 open into a relatively narrow annular groove 55 in the bottom of a relatively wide annular groove 56 formed in the circumference of the piston member 30 radially of the chamber 33 and within which latter groove a combination packing and valve member 60 is located. As shown the lower wall of the groove 55 is a continuation of the lower wall of the groove 56 and the groove 55 extends radially inwardly to a point past the inside of the center lines of the axial apertures 53, and is narrower than the diameter of the passages 54. Since the apertures 54 are formed by drilling from the exterior of the piston member, the upper wall of the groove 55 is indented as at 61 in line with the passages 54. These indentations 61, together with the fact that the groove 55 extends inwardly past the center lines of the apertures 53, provide a relatively large passage for the free flow of liquid past the piston assembly during the compression or impact stroke of the shock absorber. The intermediate flange 62 between the groove 56 and a somewhat similar groove 63 in the piston member 30 immediately above the groove 56 is of wave form as shown in the drawing with the result that the wall which forms the upper edge of the groove 56 is undulated or wavy, forming a plurality of alternate valleys and crests, in the present instance four of each, thus varying the axial dimensions of the periphery of the groove so that it is alternatively equal to and greater than the width of the valve member 60. The groove 56, as shown, is approximately twice as wide as the member 60 at its widest point. The valve member 60 is a continuous ring normally circular in cross-section and formed of resilient elastic material, such as natural rubber, synthetic rubber, or some suitable rubber-like material which will serve the intended purpose. The thickness of the valve member 60 is slightly greater than the depth of the groove 56, with the result that when it is forced into the cylinder assembly along with the piston member 30 in assembling the shock absorber, the member 60 will be slightly compressed. The construction just described is such that as the piston assembly is reciprocated within the tubular member 13 those portions of the valve member 60 which are unconfined axially stretch and move axially relative to the member 30, thus opening or closing the radially outer end of the groove 55 and the enlargements therein formed by the indentations 61 which are, in fact, extensions of the apertures 54 and/or the fluid passageway formed by the clearance between the flange 64 and the cylinder wall of the member 13, which passageway communicates with the groove 56 and with a fluid chamber 65 formed by a reduced diameter portion 66 of the piston member 13 and the cylinder wall. The principal function of the annular member 60 is to prevent the passage of fluid from one side of the piston to the other during the recoil stroke, by way of the grooves 55, 56, the clearance about the flange 64, the chamber 65, and the apertures 52 and it is immaterial whether it closes both the opening between the grooves 55 and 56 and the entrance to the clearance about the flange 64 or merely the latter.

Preferably the shock absorber also includes means for permitting a small amount of fluid to flow from one end of the working cylinder to the other at all times and for the accomplishment of this purpose in the embodiment shown, the piston member 30 is provided with a fixed orifice 68 of predetermined but small diameter, which orifice is in alignment with one of the passages 53, and with the passages 53 and the counterbore 34 forms a continuous communication between the opposite sides of the piston member 30, thus permitting a predetermined constant volume of oil to pass therethrough at all times.

The operation of the device thus far described is as follows: During the impact or compression stroke of the shock absorber the piston moves within the working cylinder in the direction indicated by the arrow 67 shown in Fig. 2 and the parts assume the relative positions shown in said figure. The bore 31 through the partition 36 of the piston member 30 is closed by the valve 37, with the result that fluid in the lower end of the working cylinder is forced to flow into the upper end thereof, that is, into the end of the working cylinder above the piston proper by way of the counterbore 34; radial openings 52; chamber 65; clearance between the inner wall of the tubular member 13 and the intermediate flange 64; lower part of groove 56; groove 55; and aperture 53. The fact that the piston 12 is moving in a downward direction relative to the tubular member 13 and the further fact that the normal thickness of the annular member 60 is greater than the depth of the groove 56 within which it is located, causes those portions of the annular member which are unconfined axially to move upward into engagement with the lower wall of the flange 62, with the result that the outer end of the groove 55 is placed in communication with the chamber 65 by way of the groove 56 and the clearance about the flange 64. The resistance effected incident to the flow of fluid from one side of the piston assembly to the other in this instance is controlled by the amount of clearance provided between the exterior of the flange 64 and the interior of the tubular member 13. Obviously, the amount of resistance produced can be determined by varying the size of any of the passages through which the fluid must travel in order to reach the opposite side of the piston assembly. It will be understood that during the impact stroke, i. e. the downward movement of the piston, a certain volume of fluid will pass through the opening 23 and the passages 20 to the reservoir.

On the recoil stroke of the shock absorber, the relative direction of the movements between the cylinder and piston assemblies is in the direction indicated by the arrow 70, see Fig. 3, and the various parts assume the relative positions shown in said figure, provided the pressure above the piston member 30 is great enough to unseat the valve 37 against the action of the spring 41, etc. When the relative direction of movement between the cylinder and piston assemblies changed from that shown in Fig. 2 to that shown in Fig. 3, the combination valve and packing member 60 moved into engagement with the lower wall of the groove 56, and closed the outer end of the fluid passage from one side of the piston to the other by way of the grooves 55 and 56, and the clearance about the flange 64, etc. Consequently the oil or fluid above the piston can only pass to the lower side thereof through the fixed orifice 68 until the pressure above the piston has reached a predetermined point sufficient to unseat the valve 37, after which the fluid can flow from the chamber 33 to the counterbore 34 by way of the passage 31. The movement of the axially unconfined portion of the combination packing and valve member 60, referred to, is produced upon movement of the piston member 30 relative to the tubular member 13 by the frictional engagement of the member 60 with the inner wall of the tubular member 13. From the foregoing it will be seen that the annular member 60 acts not only as a piston sealing packing but also as a by-pass valve.

The preferred construction shown herein also incorporates a self-energizing frictional resistance means, for supplementing the fluid resistance of the shock absorber during the impact stroke thereof, in the form of an annular member or ring 71 similar to the ring 60 and located in the groove 63 previously referred to. The upper flange 50 of the piston member 30 is of wave form, similar to the wave form of the flange 62 but having its convolutions displaced 45° with respect to the convolutions of the flange 62, thus producing a groove having alternate portions, the axial dimensions of the outer portions of which are equal to and greater than the thickness of the member 71 when in operative position. The ring 71 operates in a manner similar to the ring 60 and the unconfined portions thereof move axially of the member 30 when the direction of the relative movement between the cylinder 13 and the piston member 30 is changed. This movement is produced by the frictional engagement of the ring 71 with the interior of the cylinder 13.

The groove 63 differs from the groove 56 in that it is of varying depth, the inner or bottom wall 73 thereof being upwardly and outwardly inclined. The construction is such that when the annular member 71 is in the lower end of the groove 63, it is not substantially compressed or distorted but when the axially unconfined portions thereof move in the position shown in Fig. 2, these portions of the annular member are compressed or distorted and tightly engage the inner surface of the tubular member 13, thus creating a frictional resistance to the movement of the piston assembly in the cylinder. Sufficient clearance is provided between the peripheries of the flanges 50 and 62 to permit any fluid which might otherwise be trapped in the grooves 56 and 63 to escape and not interfere with the operation of the annular members 60 and 71. If desired, the self-energizing frictional resistance feature may be omitted altogether, as previously stated. Alternatively, it may be combined with the combination valve and packing feature by making the bottom of the groove 56 inclined upwardly and outwardly in a manner similar to the bottom 73 of the groove 63, in which event the annular member 60 will be forced into tight frictional engagement with the inner wall of the cylinder upon movement of the axially unconfined portions of the member 60 into their upper positions, that is the positions shown in Fig. 2.

From the foregoing description of the preferred embodiment of the invention it will be apparent that the objects heretofore enumerated and others have been accomplished and that a novel and improved fluid pressure device, and particularly a novel and improved fluid shock absorber has been provided. While the preferred embodiment of the invention has been described with considerable detail it is to be understood that the invention is not limited to shock absorbers or to the particular construction shown.

Other alternative constructions will be obvious to those skilled in the art to which the invention relates and it is my intention to hereby cover all adaptations, modifications and uses of the device disclosed herein which come within the practice of those skilled in the art to which the invention relates and within the spirit and scope of the appended claims.

Having thus described my invention, I claim:

1. In a fluid pressure mechanism the combination of a cylinder member, a piston or plunger member reciprocable in said cylinder member, one of said members having an annular groove opening towards the adjacent wall of the other of said members, and a resilient annular member positioned in said groove the depth of which is less than the normal thickness of said annular member and the axial dimension of a portion of which is greater than the axial dimension of said annular member while the axial dimension of another portion thereof is equal to the axial dimension of said annular member when in operative position.

2. In a fluid pressure mechanism the combination of a cylinder member, a piston or plunger member reciprocable in said cylinder member and having an annular groove opening towards the adjacent wall of said cylinder member, and a resilient annular member of normally round cross-section positioned in said groove the depth of which is less than the normal thickness of said annular member and the axial dimensions of a plurality of alternate portions of which are greater than and equal to the axial dimension of said annular member when in operative position.

3. In a fluid pressure mechanism the combination of a cylinder member, a piston or plunger member reciprocable in said cylinder member and having an annular groove in the circumference thereof, and a resilient annular member of normally round cross-section positioned in said groove the depth of which groove is less than the normal thickness of said annular member and one side wall of which is undulated axially forming alternate portions of greater axial dimension than that of said annular member and of equal axial dimension to that of said annular member when in operative position.

4. In a fluid pressure mechanism the combination of a cylinder member, a piston or plunger member reciprocable in said cylinder member, said piston member having an annular groove in the circumference thereof, and a resilient annular member positioned in said groove the depth of which is less than the normal thickness of said annular member and the axial dimensions of alternate portions of which groove are greater than and equal to the axial dimension of said annular member when in operative position, means forming a fluid passageway from one side of said piston to the other adapted to be automatically closed by said annular member when in contact with one of the side walls of said groove incident to movement of said piston member in one direction and automatically opened when the axially unconfined portion of said annular member is shifted in said groove axially of the piston upon movement of said piston in the opposite direction.

5. In a fluid shock absorber the combination of a cylinder, a piston reciprocable in said cylinder and having an annular groove in the circumference thereof, and a resilient annular member positioned in said groove the depth of which groove is less than the normal thickness of said annular member and the axial dimensions of alternative portions of which groove are greater than and equal to the axial dimension of said annular member when in operative position, said piston having a fluid passageway communicating with opposite ends thereof adapted to be closed by said annular member when in contact with one of the axial walls of said groove incident to movement of said piston member in one direction and automatically opened when the axially unconfined portion of said annular member is shifted in said groove axially of said piston upon movement thereof in the opposite direction.

6. In a fluid shock absorber the combination of a cylinder, a piston reciprocable in said cylinder, said piston member having an annular groove in the circumference thereof, and a resilient annular member of normally round cross-section positioned in said groove the depth of which is less than the normal thickness of said annular member and the axial dimensions of alternate portions of which are greater than and equal to the axial dimension of said annular member when in operative position, said piston having a fluid passageway communicating with opposite ends thereof adapted to be closed by said annular member when in contact with one of the axial walls of said groove incident to movement of said piston member in one direction and automatically opened when the axially unconfined portion of said annular member is shifted in said groove axially of said piston upon movement thereof in the opposite direction.

7. In a fluid shock absorber the combination of a cylinder, a piston reciprocable in said cylinder, said piston member having an annular groove in the circumference thereof and a resilient annular member of normally round cross-section positioned in said groove the depth of which is less than the normal thickness of said annular member and the axial dimensions of alternate portions of which are greater than and equal to the axial dimension of said annular member, said piston having a fluid passageway communicating with opposite ends thereof adapted to be alternately closed and opened by the axially unconfined portion of said annular member upon alternate reciprocation of said piston within said cylinder.

8. In a shock absorber the combination of a cylinder, a piston reciprocable within said cylinder, means for imparting frictional resistance to the movement of said piston in one direction and including an annular recess in the periphery of the piston and of diminishing depth axially of said piston, and a resilient friction member mounted in said recess the axial dimension of a portion of which recess is greater than the axial dimension of said friction member while the axial dimension of another portion of said recess is equal to the axial dimension of said resilient member when in operative position, whereby the axially unconfined portion of said resilient member is shiftable in said recess from the portion of greatest depth into a portion of lesser depth and vice versa depending upon the direction of movement of said piston to exert no substantial frictional contact with the wall of said cylinder upon movement of said piston in one direction but to tightly engage the cylinder wall and exert a substantial frictional resistance to the movement of the piston in the reverse direction.

9. In a shock absorber the combination of a cylinder, a piston reciprocable within said cylinder, means for imparting frictional resistance to the movement of said piston in one direction and including an annular groove about the periphery of the piston, and a resilient annular friction member or ring normally of circular cross-section and of greater thickness than the depth of said groove mounted in said groove, the axial dimensions of alternate portions of which groove are greater than and equal to the axial dimension of said resilient member when in operative position and the depth of said groove diminishing axially of said piston whereby the axially unconfined portions are alternately shiftable in said groove upon alternate reciprocation of the piston from portions of greater depth to portions of lesser depth to exert no substantial frictional contact with the wall of said cylinder and to tightly engage the cylindrical wall and exert a substantial frictional resistance to the movement of the piston.

EUGENE L. BEECHER.